United States Patent
Tao et al.

(10) Patent No.: US 8,649,188 B2
(45) Date of Patent: Feb. 11, 2014

(54) SOLID STATE PULSED POWER GENERATOR

(75) Inventors: Fengfeng Tao, Clifton Park, NY (US); Seyed Gholamali Saddoughi, Clifton Park, NY (US); John Thomas Herbon, Loveland, OH (US)

(73) Assignee: General Electric Company, Niskayuna, NY (US)

( * ) Notice: Subject to any disclaimer, the term of this patent is extended or adjusted under 35 U.S.C. 154(b) by 236 days.

(21) Appl. No.: 13/285,102

(22) Filed: Oct. 31, 2011

(65) Prior Publication Data

US 2013/0107590 A1 May 2, 2013

(51) Int. Cl.
*H02M 3/335* (2006.01)
*H02M 3/24* (2006.01)

(52) U.S. Cl.
USPC ............. 363/17; 363/21.02; 363/98; 363/132

(58) Field of Classification Search
USPC .................................. 363/17, 21.02, 98, 132
See application file for complete search history.

(56) References Cited

U.S. PATENT DOCUMENTS

| | | | |
|---|---|---|---|
| 5,561,597 A * | 10/1996 | Limpaecher | 363/59 |
| 5,774,348 A * | 6/1998 | Druce et al. | 363/60 |
| 6,760,675 B1 | 7/2004 | Szwec et al. | |
| 7,177,164 B1 | 2/2007 | Bearden | |
| 7,767,433 B2 * | 8/2010 | Kuthi et al. | 435/285.2 |
| 2006/0029111 A1 | 2/2006 | Liu | |
| 2007/0031959 A1 * | 2/2007 | Kuthi et al. | 435/283.1 |
| 2007/0098025 A1 | 5/2007 | Hong et al. | |
| 2007/0139090 A1 | 6/2007 | Cassel | |
| 2007/0146092 A1 | 6/2007 | Cassel | |
| 2008/0106151 A1 | 5/2008 | Ryoo et al. | |
| 2008/0238211 A1 | 10/2008 | Yampolsky | |
| 2009/0219071 A1 | 9/2009 | Tao et al. | |
| 2010/0156195 A1 * | 6/2010 | Sanders et al. | 307/108 |
| 2011/0065161 A1 | 3/2011 | Kwasinski et al. | |

OTHER PUBLICATIONS

Gao L et al., "All-Solid-State Pulse Adder With Bipolar High Voltage Fast Narrow Pulses Output ", Dielectrics and Electrical Insulation, IEEE Transactions, ISSN :1070-9878, vol. 18, Issue:3, on pp. 775-782, Issue Date: Jun. 2011.

* cited by examiner

*Primary Examiner* — Bao Q Vu
(74) *Attorney, Agent, or Firm* — Francis T. Coppa

(57) ABSTRACT

A power generator includes one or more full bridge inverter modules coupled to a semiconductor opening switch (SOS) through an inductive resonant branch. Each module includes a plurality of switches that are switched in a fashion causing the one or more full bridge inverter modules to drive the semiconductor opening switch SOS through the resonant circuit to generate pulses to a load connected in parallel with the SOS.

21 Claims, 3 Drawing Sheets

SOLID STATE PULSED POWER GENERATOR

This invention was made with Government support under sub contract number DE-FC26-08NT05868 awarded by the United States Department of Energy. The Government has certain rights in the invention.

BACKGROUND

The invention relates generally to electronic power conversion and more particularly to a solid state high voltage, fast rise/fall time, and variable pulse repetition rate pulse generator using inductive energy storage devices.

Voltage generators such as plasma generators capable of operating at high voltages with fast pulse rise and fall times, and high pulse repetition rates have generally employed radio frequency (RF) power amplifiers and related technology to accomplish high voltage, high speed and high pulse repetition rate generation and transmission. Such RF power amplifiers are expensive to produce and suffer in reliability due to internal heat build-up during high pulse repetition rate generation. RF amplifiers also undesirably require significant real estate and generally have low electric efficiency. Further, RF power amplifier technology is not particularly suitable for generation of high pulse repetition rates due to thermal losses, among other things.

Known high voltage pulse generators for the generation of plasma and the like generally employ gap type switches that substantially limit the upper pulse repetition rate as well as the overall system reliability level. These known high voltage pulse generation systems also require a substantial amount of real estate to provide a working system due to structural limitations.

Various voltage multiplication and transformation techniques were previously employed for the pulse power generators with an output voltage over tens of kV. The most famous Marx generator involves charging a bank of capacitors in parallel and discharging them in series by means of closing switches. The output voltage is effectively equal to N time of charging voltage, where N is the number of capacitors in series. The circuits of this type have found very wide application in pulsed power technology. The technical challenges lie in finding suitable closing switches and a fast, effective recharging circuitry for a fast rise time and high repetition rate.

The Fitch generator employs a similar concept to the Marx generator but with the number of switches being halved. Initially, the capacitor bank is charged from a dc voltage source, as in a Marx generator circuit. As the switches close, the even capacitors start discharging through the inductors L in an oscillatory fashion with a time period that equals $\pi*\sqrt{(LC)}$. The voltage across the capacitors reverses sign and the output voltage of the generator becomes N times the charging voltage, where N is the number of the stages. One added benefit of the Fitch generator is that the resistances and inductances of the switches have no effect on the circuit output impedance. However, the switches must be operated as simultaneously as possible and the LC stages must be constructed with identical time constants as much as possible.

Tesla transformers, line transformers, conventional pulse transformers and autotransformers are magnetically coupled devices and widely used to multiply input voltage. However, because of their poor frequency characteristics, they cannot be employed directly in nanosecond pulse power technology, but generally on the microsecond time scale.

Other techniques, such as voltage adders consisting of N single-turn pulse transformers with a common secondary winding, have demonstrated usefulness in voltage multiplication. However, the choice of the close switch type, recharging circuit and physical construction pose significant challenges. One significant challenge is associated with the electromagnetic compatibility (EMC) design concepts. Due to the tremendous amount of high power generated within nanosecond time scales and repetitive requirements at tens of kilo hertz, the emitted electromagnetic energy by the plasma may cause an improper operation of the pulse generator and other equipment as well in the same electromagnetic environment. Susceptibility and/or immunity design features of the pulse power generator are therefore very important when used in practical applications.

It would be both advantageous and beneficial to provide a high voltage, fast rise/fall time, high pulse repetition rate pulse generator with electromagnetic hardening enhancement features that overcome the high pulse repetition rate limitations associated with conventional high voltage pulse generators. It would be further advantageous if the high voltage, fast rise/fall time, high pulse repetition rate pulse generator were capable of continued operation without impairment of the pulse generator during substantially longer time periods than that achievable using conventional high voltage pulse generators. It would be further advantageous if the high voltage, fast rise/fall time, high pulse repetition rate pulse generator occupied substantially less real estate to provide a working system than that required by conventional high voltage pulse generators.

BRIEF DESCRIPTION

Briefly, in accordance with one embodiment, a power generator comprises:
  one or more full bridge inverter modules, each module comprising a plurality of switches;
  a semiconductor opening switch (SOS); and
  a resonant circuit, wherein the resonant circuit couples the one or more bridge inverter modules directly to the SOS.

According to another embodiment, a power generator comprises:
  a plurality of switches configured to provide one or more full bridge inverter modules;
  a semiconductor opening switch (SOS); and
  an inductive pulse forming line coupling the one or more full bridge inverter modules directly to the SOS.

According to yet another embodiment, a power generator comprises:
  a full bridge inverter stack comprising a pair of output ports;
  a semiconductor opening switch (SOS); and
  an inductive pulse forming resonant circuit, wherein the inductive pulse forming resonant circuit couples the full bridge inverter stack output ports directly to the SOS.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
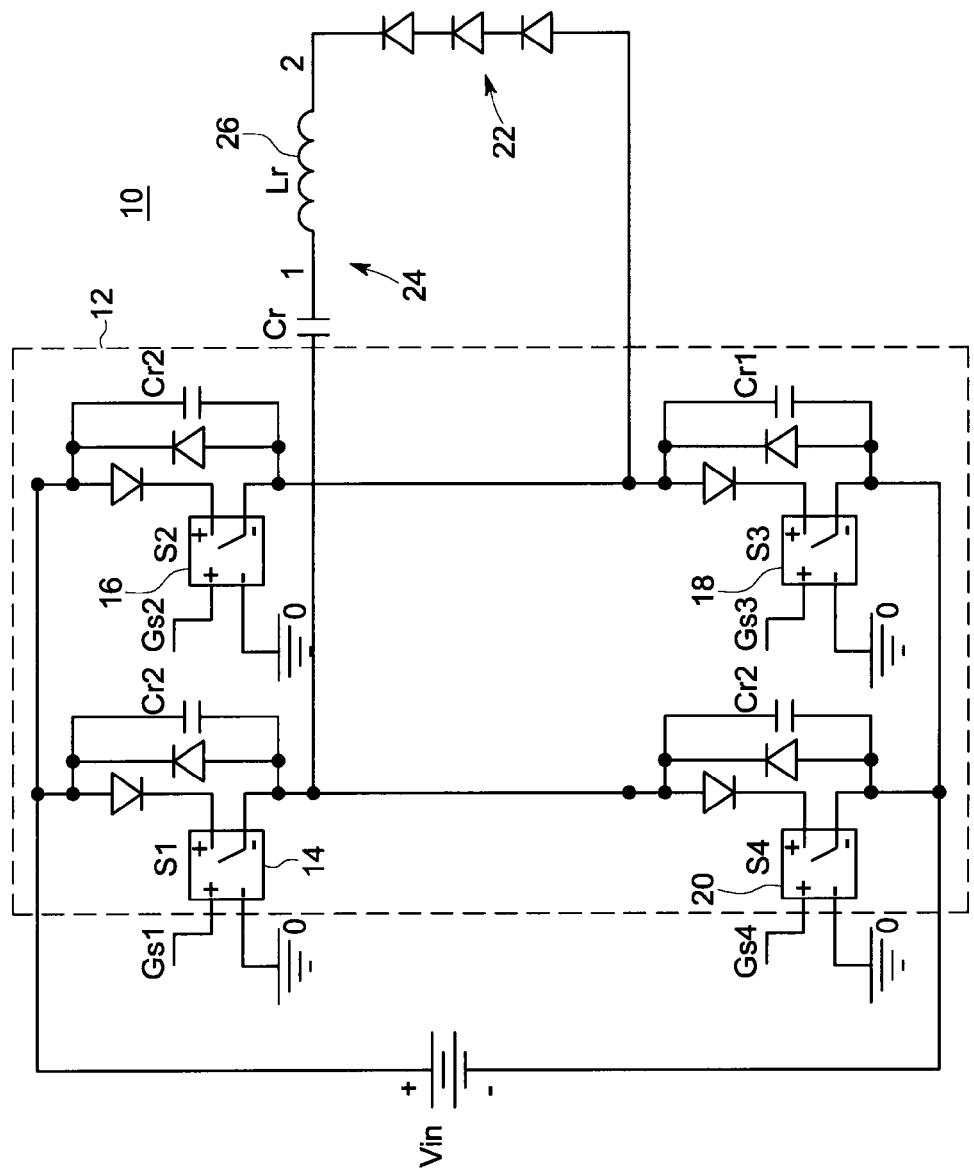
FIG. 1 is a simplified system diagram illustrating a high voltage, fast rise/fall time, variable repetition rate power generator according to one embodiment.

FIG. 1 is a simplified system diagram illustrating a high voltage, fast rise/fall time, variable repetition rate power generator 10 according to one embodiment. Power generator 10 comprises a full bridge inverter 12 that includes switches (S1 to S4) 14, 16, 18 and 20. Suitable switching devices include, without limitation, high voltage switching MOSFETs. Full bridge inverter 12 drives a semiconductor opening switch (SOS) 22 through a resonant branch Lr-Cr 24 to generate pulses.

When switches (S2) 16 and (S4) 20 are turned on, a forward current is established inside inductor Lr 26 in a resonant fashion. This current reverses its direction after half resonant cycle and switches (S2) 16 and (S4) 20 are turned off and while switches (S1) 14 and (S3) 18 are turned on.

Figure 2:
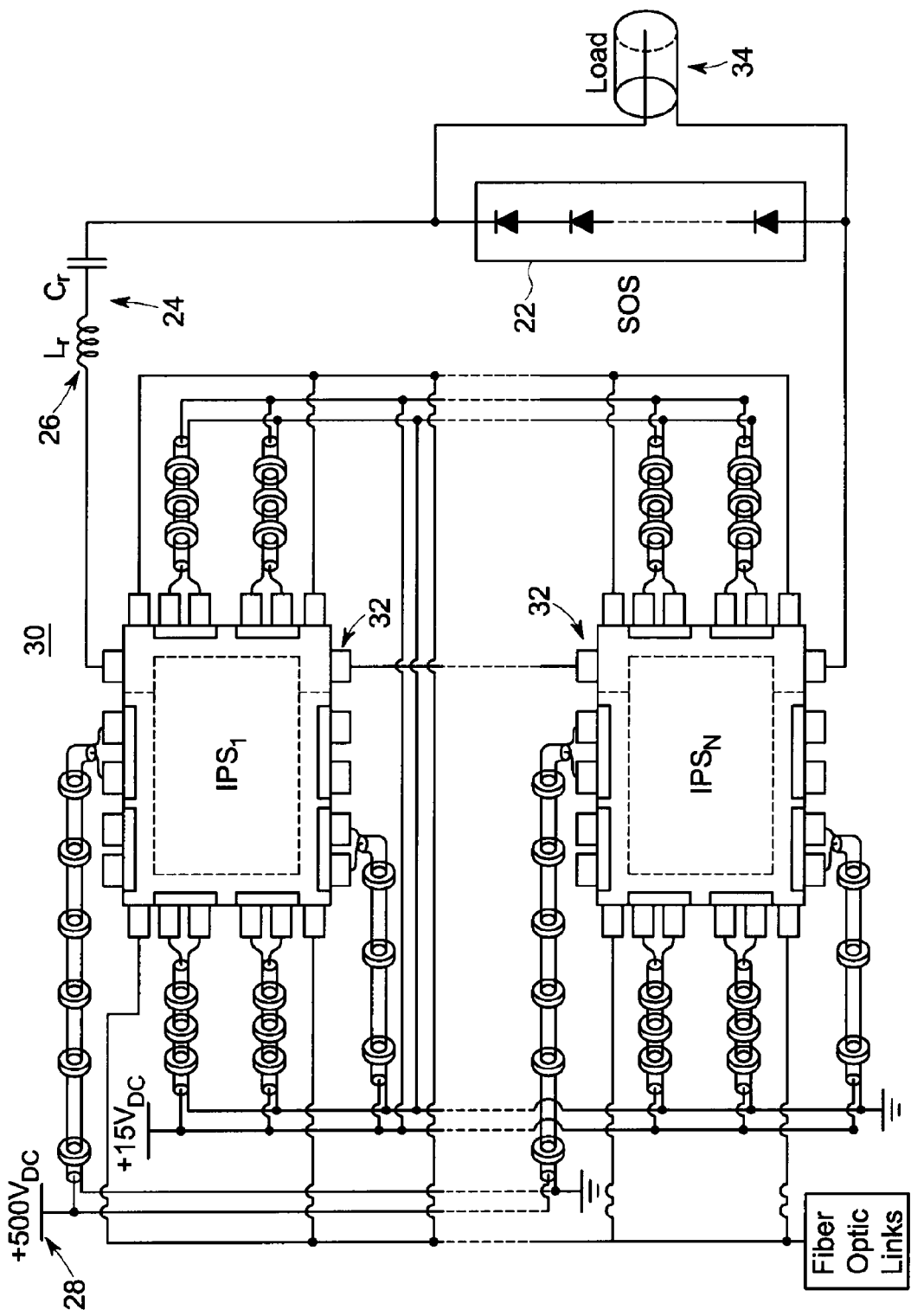
FIG. 2 is a simplified system diagram illustrating a high voltage, fast rise/fall time, variable repetition rate power generator with electromagnetic hardening enhancement features according to another embodiment.

Due to the characteristics of the SOS 22, SOS 22 stays on until the current inside inductor Lr 26 reaches a negative peak. At that time, the SOS 22 turns off rapidly, disrupting the inductor 26 current flowing through it. The inductor 26 current drives a corresponding load such as depicted in FIG. 2, thus creating a fast rise pulse on the load that is connected in parallel with the SOS 22.

The magnitude of the fast rise pulse is substantially proportional to the DC voltage (Vin) 28. Vin 28 however, is limited by the working voltage of the switches 14-20 that is generally about 1 kV for high voltage fast turn-on/off MOSFETs that employ current semiconductor technology. The output voltage of the full bridge inverter 12 can be increased according to one embodiment by stacking a plurality of full bridge inverters such as illustrated in FIG. 2.

According to one embodiment, the power converter 10 can achieve a pulse repetition rate exceeding 100 kpps, a pulse rise/fall time of about 10 nanoseconds, a high voltage magnitude of at least 30 kV, and a pulse width of about 20 nanoseconds.

The use of solid state based switches 14-20 advantageously allows power generator 10 to be constructed in a manner that is substantially smaller, substantially more efficient, and substantially more reliable than conventional gap switch pulse generators commonly employed in the prior art.

FIG. 2 is a simplified system diagram illustrating a high voltage, fast rise/fall time, variable repetition rate power generator 30 according to another embodiment. Power generator 30 comprises a plurality of full bridge inverter modules 32 stacked together in a configuration that increases the output voltage across a load 34 connected in parallel with a semiconductor opening switch 22. The modules 32 are designed in a way that the charging circuitry and gate driver are fully isolated with the fiber optic links for the gating signal and multiple coaxial cables with multiple toroidal cores for low voltage gate drive power and high voltage charging power. Noise coupling paths are effectively minimized and damped so that the embodied system can be properly operated in an electromagnetic noisy environment. Many of these features are described in further detail herein with reference to FIG. 3.

Suitable switching devices include, without limitation, high voltage switching MOSFETs, as stated herein. Similar to operation of the full bridge inverter 12, the stacked full bridge inverter modules 32 together drive a semiconductor opening switch (SOS) 22 through a resonant branch Lr-Cr 24 to generate pulses.

Similar to the full bridge inverter 12 structure depicted in FIG. 1, each stack inverter 32 comprises switches S2-S4. These switches are turned on, establishing a forward current inside inductor Lr 26 in a resonant fashion. This current reverses its direction after half resonant cycle and switches S2 and S4 are turned off and while switches 51 and S3 are turned on, as stated herein with reference to FIG. 1.

Due to the characteristics of the SOS 22, SOS 22 stays on until the current inside inductor Lr 26 reaches a negative peak. At that time, the SOS 22 turns off rapidly, disrupting the inductor 26 current flowing through it. The inductor 26 current drives a corresponding load 34, thus creating a fast rise pulse on the load 34 that is connected in parallel with the SOS 22.

The magnitude of the fast rise pulse is substantially proportional to the DC voltage (Vin) 28. The output voltage of the stack of full bridge inverter modules 32 is thus increased by the stacking of full bridge inverter modules 32.

Figure 3:
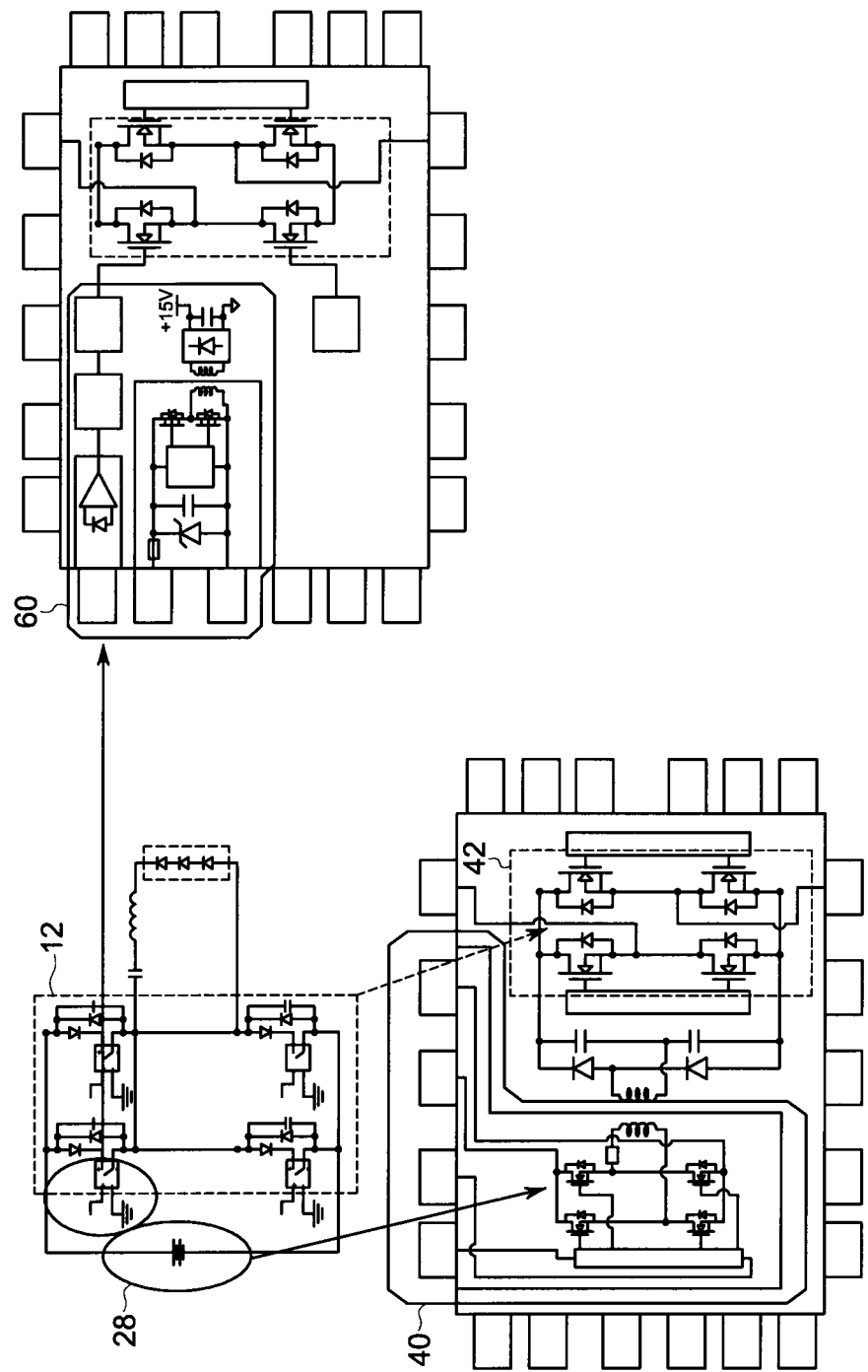
FIG. 3 is a more detailed system diagram for portions of the power generator depicted in FIG. 1 according to one embodiment.

FIG. 3 is a more detailed system diagram for portions of the power generator 10 depicted in FIG. 1 according to one embodiment. The lower left portion of power generator 10 illustrates an isolated charging circuit 40 that provides a galvanic barrier between the charging circuit 40 and a MOSFET module 42 and is suitable to generate the desired DC voltage (Vin) 28 to the MOSFET module 42 that forms the full bridge inverter 12. Each MOSFET switch S1-S4 is driven via a corresponding gate drive module 60 that also employs a galvanic barrier. Each gate drive module 60 comprises an isolated, high speed, current source according to one embodiment.

A significant advantage provided by the power generator 10 using the foregoing inductive energy storage principles described herein is improved load driving capabilities. Another significant advantage provided by the foregoing inductive energy storage principles is the increased capability to expand a power generator system using a modular design approach.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generator comprising:
   one or more full bridge inverter modules, each module comprising a plurality of switches;
   a semiconductor opening switch (SOS); and
   a resonant circuit, wherein the resonant circuit couples the one or more bridge inverter modules directly to the SOS.

2. The power generator according to claim 1, wherein the plurality of switches comprise MOSFET switches.

3. The power generator according to claim 1, wherein the semiconductor opening switch comprises a plurality of semiconductor diodes connected together in series.

4. The power generator according to claim 1, wherein the one or more full bridge inverter modules are configured as a full bridge inverter module stack when the power generator comprises more than one full bridge inverter module.

5. The power generator according to claim 1, wherein the resonant circuit comprises at least one inductive element.

6. The power generator according to claim 5, wherein the resonant circuit further comprises at least one capacitor.

7. The power generator according to claim 1, further comprising a load connected in parallel to the SOS.

8. The power generator according to claim 1, further comprising a plurality of isolated, high speed, current source gate drive circuits, each gate drive circuit driving a single full bridge inverter module switch.

9. The power generator according to claim 1, further comprising one or more isolated charging circuits, each isolated charging circuit configured to provide a DC input voltage to a single full bridge inverter module.

10. A power generator comprising:
    a plurality of switches configured to provide one or more full bridge inverter modules;
    a semiconductor opening switch (SOS); and
    an inductive pulse forming line coupling the one or more full bridge inverter modules directly to the SOS.

11. The power generator according to claim 10, wherein the plurality of switches comprise MOSFET switches.

12. The power generator according to claim 10, wherein the semiconductor opening switch comprises a plurality of semiconductor diodes connected together in series.

13. The power generator according to claim 10, wherein the one or more full bridge inverter modules are configured as a full bridge inverter module stack when the power generator comprises more than one full bridge inverter module.

14. The power generator according to claim 10, wherein the resonant circuit comprises at least one inductive element.

15. The power generator according to claim 14, wherein the resonant circuit further comprises at least one capacitor.

16. The power generator according to claim 10, further comprising a plurality of isolated, high speed, current source gate drive circuits, each gate drive circuit driving a single full bridge inverter module switch.

17. The power generator according to claim 10, further comprising one or more isolated charging circuits, each isolated charging circuit configured to provide a DC input voltage to a single full bridge inverter module.

18. A power generator comprising:
    a full bridge inverter stack comprising a pair of output ports;
    a semiconductor opening switch (SOS); and
    an inductive pulse forming resonant circuit, wherein the inductive pulse forming resonant circuit couples the full bridge inverter stack output ports directly to the SOS.

19. The power generator according to claim 18, wherein the semiconductor opening switch comprises a plurality of semiconductor diodes connected together in series.

20. The power generator according to claim 18, further comprising a plurality of isolated, high speed, current source gate drive circuits, each gate drive circuit driving a single full bridge inverter module switch.

21. The power generator according to claim 18, further comprising one or more isolated charging circuits, each isolated charging circuit configured to provide a DC input voltage to a single full bridge inverter module.

* * * * *